(12) United States Patent
Myers et al.

(10) Patent No.: US 6,429,616 B1
(45) Date of Patent: Aug. 6, 2002

(54) METHOD OF ESTIMATING THE DC BUS VOLTAGE IN ELECTRIC MACHINE DRIVES

(75) Inventors: Garold Paul Myers, Northville; Michael W. Degner, Farmington Hills, both of MI (US); Michael Harke, Madison, WI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/820,487

(22) Filed: Mar. 29, 2001

(51) Int. Cl.[7] ................................................. H02P 7/06
(52) U.S. Cl. ......................................................... 318/459
(58) Field of Search ................................. 318/459, 500, 318/722, 801, 812; 388/928.1

(56) References Cited

U.S. PATENT DOCUMENTS

| | | | |
|---|---|---|---|
| 5,420,492 A | | 5/1995 | Sood et al. |
| 5,585,709 A | | 12/1996 | Jansen et al. |
| 5,786,708 A | * | 7/1998 | Premerlani et al. .......... 324/772 |
| 5,841,262 A | | 11/1998 | Tang |
| 5,886,498 A | | 3/1999 | Sul et al. |
| 5,998,957 A | * | 12/1999 | Tadmor et al. .............. 318/701 |
| 6,069,467 A | | 5/2000 | Jansen |
| 6,137,258 A | | 10/2000 | Jansen |
| 6,262,896 B1 | * | 7/2001 | Stancu et al. ........... 318/802 X |

* cited by examiner

Primary Examiner—Bentsu Ro

(57) ABSTRACT

An electric machine drive system uses an estimation of the DC bus voltage to improve machine drive control. The DC bus voltage is estimated by injecting a carrier signal into the machine drive and determining the magnitude of the positive sequence current component induced in the drive by the carrier signal. The measured magnitude of current may be referenced to the anticipated magnitude of the current in order to produce an inverse value of the estimated DC bus voltage that is then used to normalize the commanded voltage signal driving the machine. Alternatively, a look-up table is used to relate the measured magnitude of the current component to a corresponding estimated value of the bus voltage.

12 Claims, 4 Drawing Sheets

METHOD OF ESTIMATING THE DC BUS VOLTAGE IN ELECTRIC MACHINE DRIVES

FIELD OF THE INVENTION

The present invention generally relates to electric machine drive systems and deals more particularly with the estimation of bus voltage for use in both fault protection and machine control.

BACKGROUND OF THE INVENTION

In connection with modern electric machine drives, knowledge of the DC bus voltage used to drive a machine is employed for both fault protection and control. In electric and hybrid electric vehicle applications, for example, this knowledge is also crucial in determining the state of charge of a battery used to power the vehicle. In order to measure the bus voltage for the vehicle drive system, analog circuits are typically employed, however this method of bus voltage estimation requires unnecessary hardware and suffers from other shortcomings.

Within the last decade, significant advancements have been made in the area of sensorless control of electric machines. In order to avoid the use of dedicated sensors for determining rotor speed and position, methods have been developed for estimating the rotor or flux position by injecting a high frequency voltage or current signal into the machine, referred to as a carrier signal. These methods yield information used for regulating torque and speed without the need for a position or flux sensor. The carrier signal injection can be achieved by injecting either current or voltage, and in the description that follows, only voltage injection will be discussed, although the same estimation routines can be applied to current injection.

The elimination of the position or flux sensor using sensorless control results in lower costs, increased reliability, and potentially increasing the performance of the system. Cost reduction is achieved as a result of the elimination of the physical sensor and its associated cabling and connectors. By decreasing the amount of connections and hardware complexity, the reliability of the motor and its regulation system is increased. Because low resolution sensors are normally used in automotive vehicle applications, the use of sensorless control is capable of substantially increasing system performance.

The injection of a positive rotating carrier voltage signal into a motor, in addition to the fundamental excitation used to drive the motor, induces a current in the motor that is comprised of two components, a positive rotating sequence and a negative rotating sequence. The negative rotating sequence may contain spatial information concerning the position of the rotor or the flux in the motor if the machine is salient, whereas the positive sequence contains information relating to the bulk properties of the motor and drive system.

Although a number of techniques have been devised for sensorless control of electric machines, none have also been used for estimating the bus voltage.

SUMMARY OF THE INVENTION

It is an object of the present invention to provide a method of estimating the bus voltage of an electric machine drive system by injecting a carrier signal into the system and determining the magnitude of the positive sequence current component induced in the system by the carrier signal.

In accordance with the primary object of the invention, in a preferred embodiment, the method comprises injecting a carrier signal into the machine; determining the magnitude of the positive sequence current component induced in the machine by the carrier signal; estimating the bus voltage of the system using the determined magnitude of the current component, and altering the commanded voltage used to drive the machine based on the estimated bus voltage.

An advantage of the present method is that the bus voltage may be estimated without the need for physical voltage sensors by interpreting the positive sequence component of current induced in the machine by the carrier signal. An added advantage of the invention is that the method may be employed with existing sensorless control systems for electric machine drives.

These and other features and advantages of the present invention may be better understood by considering the following details of a description of a preferred embodiment of the invention. In the course of this description, reference will frequently be made to the attached drawings.

DETAILED DESCRIPTION OF THE PREFERRED EMBODIMENT

Figure 1:
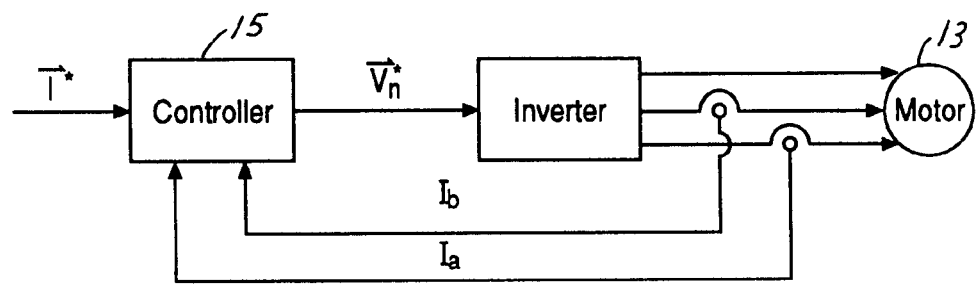
FIG. 1 is a block diagram of a general structure of a drive system.
Figure 2:
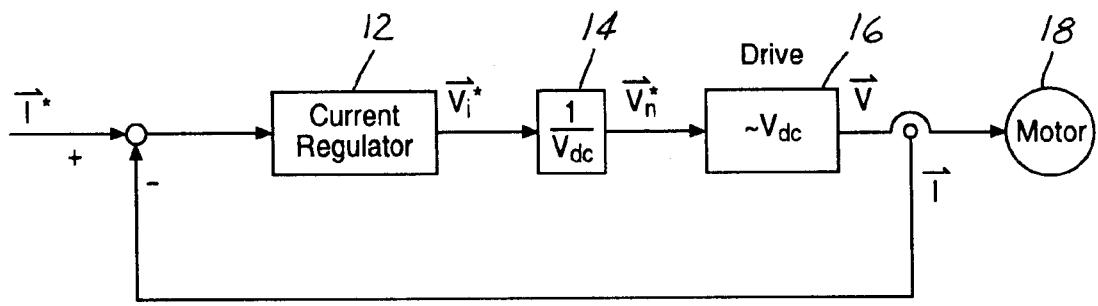
FIG. 2 is a block diagram of a current regulator for an electric machine drive system.

FIG. 1 depicts the general structure of a drive system 11 for driving an electric machine such as a rotating electric motor 13. The drive system 11 broadly includes a controller and an inverter 17. The drive system 11 is expanded and simplified in FIG. 2 such that the controller 15 becomes the current regulator 12 and normalization block 14, and the inverter 17 is referred to as the drive 16. As shown in FIG. 2, a gain corresponding to the DC bus voltage can be used as a simple model of the inverter 16 and its associated switching. The output of the current regulator 12, being the command voltage for the motor 18, is scaled by the DC bus voltage to produce a normalized drive command that corresponds to the switching duty cycles of the inverter 16.

Typically, a measurement is made of the bus voltage, and this measured value is used to perform the normalization. However, if the bus voltage measurement is in error and does not correspond to the actual bus voltage, errors in the voltage applied to the motor 18 will result.

Figure 3:
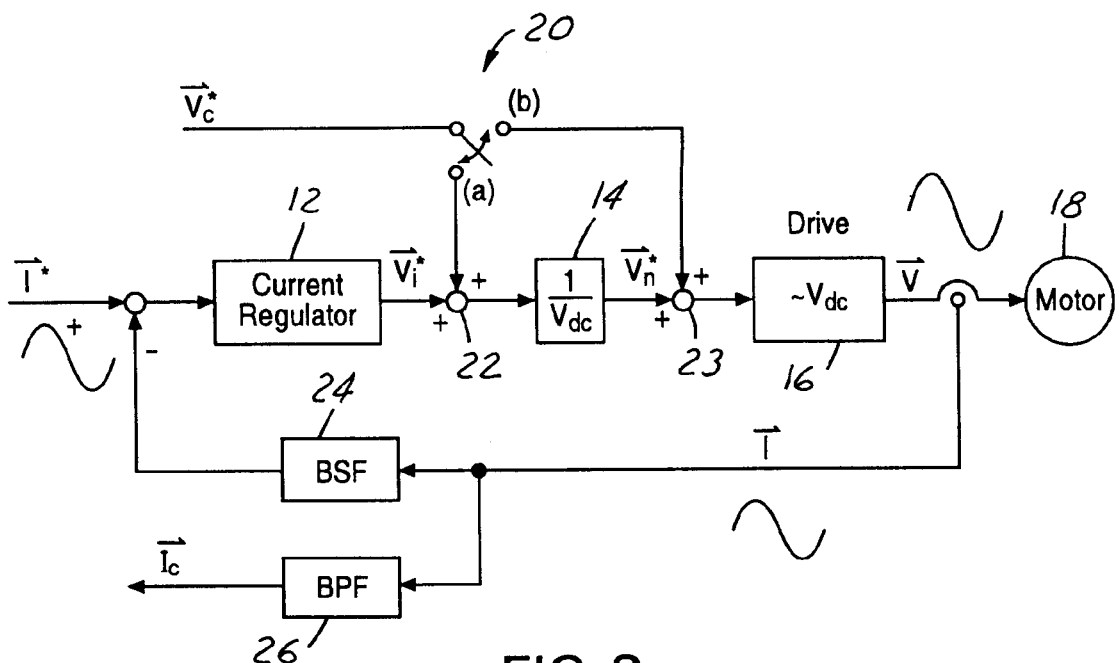
FIG. 3 is a block diagram similar to FIG. 2 but showing additional components used for injecting high frequency carrier signals into the drive, for the purpose of DC bus voltage estimation.

Referring now to FIG. 3, by injecting a balanced high frequency voltage (carrier) signal into the drive after the current regulator 12, an estimation of bus voltage can be made. The injection of the high frequency carrier signal can occur either before or after the normalization process by the DC bus voltage. Specifically, the high frequency voltage carrier signal may be injected into the drive signal prior to normalization by the controller 14, where the carrier signal is combined at 22 with the voltage command output by the current regulator 12. Alternatively, as indicated by the switch 20, the carrier signal may be injected as a fixed normalized quantity, resulting in a fixed inverter duty cycle command, after the controller normalization 14, where it is combined at 23 with the normalized current regulator voltage command signal. Although the location at which the carrier signal is injected affects the implementation for the estimation routine, the physics underlying the implementation is the same. The feedback derived from the output of drive 16 is passed through a bandstop filter (BSF) 24 to remove the carrier signal from the fundamental excitation for feedback into the current regulator 12. This insures that the additional high frequency content due to the carrier signal injection, which is not part of the current command, is removed so that a false error signal is not generated by the current regulator.

The differential equation describing a circuit comprised of an inductance and a resistance in series is given by equation (1) below which is also a simplified representation of the circuit of an electric machine:

$$v = L\frac{di}{dt} + Ri \qquad (1)$$

At high frequencies, the inductance term dominates and the equation can be approximated by equation (2) below:

$$v \cong L\frac{di}{dt} \qquad (2)$$

For a constant high frequency voltage, the differential equation can be solved to yield equation (3) below where a letter $\omega_c$ denotes the frequency of the carrier signal and j represents a 90° C. relationship between the voltage and current, i.e., if the voltage is a cosine wave, the current would be a sine wave with respect to the voltage.

$$v = j\omega_c Li \qquad (3)$$

From this relationship it can be seen that the voltage and current are directly related to each other, scaled by the signal frequency and inductance. This equation is the basis for the estimation method according to the present invention.

As previously described, a change in the DC bus voltage measurement or estimation used in the controller directly affects the magnitude of voltage applied to the machine. The machine current is subsequently affected in direct proportion to the DC bus voltage. By monitoring the magnitude of the machine current at the carrier frequency, an estimation of the DC bus voltage can be made.

Figure 4:
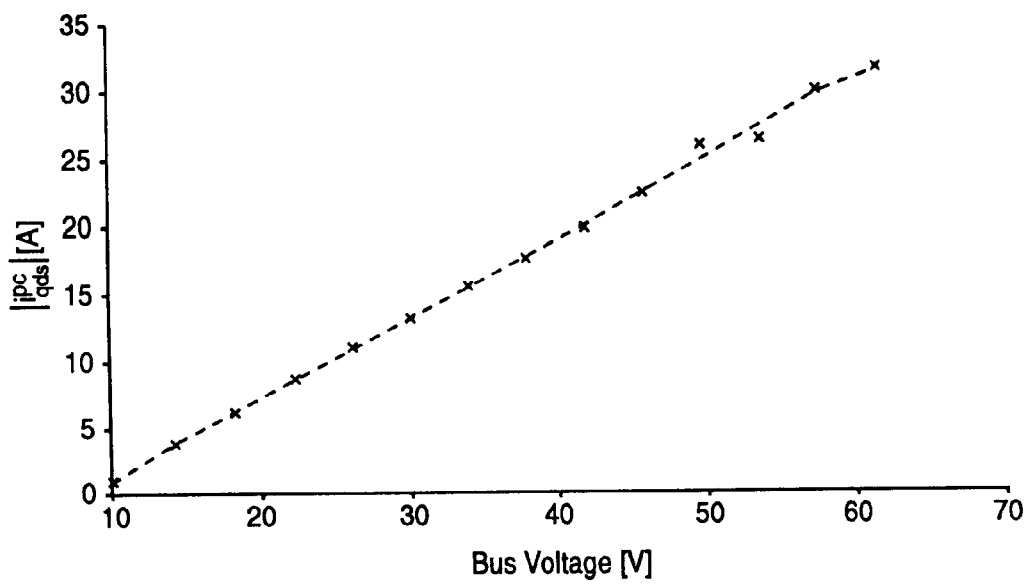
FIG. 4 is a plot of the carrier signal current magnitude versus the DC bus voltage for a constant ratio of commanded carrier signal voltage to the DC bus voltage.
Figure 5:
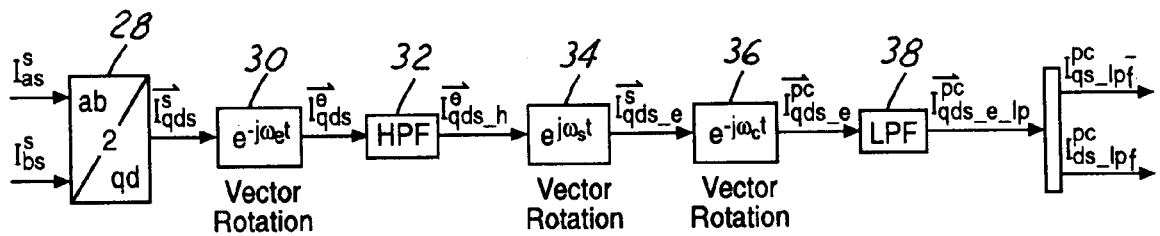
FIG. 5 is a block diagram showing the signal processing used to determine the positive sequence current at the carrier frequency for the measured phase A and B currents.

FIG. 4 is a plot showing the carrier signal current magnitude versus the bus voltage for a constant ratio of commanded carrier signal voltage to the DC bus voltage. The magnitude of the voltage command represents 11.9% of the DC bus voltage. For example, with a 42 V DC bus, the carrier voltage magnitude is 5 V and for a 25.2 V DC bus the carrier voltage magnitude is 3 V. As may be seen from this plot, a direct relationship exists between the current and bus voltage, and it may be appreciated that the magnitude of the positive sequence current vector at the carrier frequency is related to the DC bus voltage. To isolate the positive sequence carrier signal, the measured current is first rotated to a reference frame synchronous to the fundamental excitation. Using a high pass filter (HPF), the fundamental excitation can be removed from the signal, leaving just the carrier signal. The signal Is then rotated to the positive sequence carrier signal reference frame and low pass filtered to remove any noise and negative sequence components. In the positive sequence reference frame, the carrier signal is a DC quantity. FIG. 5 is a block diagram showing the transformations and signal processing used to isolate the positive sequence carrier signal current from the measured current signal. The signal processing can be condensed and summarized as shown originally in FIG. 3 as bandpass filtering (BPF) 26 at the positive sequence carrier frequency. As is shown in FIG. 4, the measured current signals are rotated at 30, filtered by a highpass (HPF) filter 32, following which they are rotated twice at 34 and 36 before being filtered by the lowpass filter (LPF) 38.

The magnitude of the positive sequence signal contains the information about the bus voltage level. The magnitude calculation can be performed in several ways. One method is to calculate the magnitude of the vector (4):

$$|i_{qds}^{pc}| \equiv \sqrt{(i_{qs}^{pc})^2 + (i_{ds}^{pc})^2} \qquad (4)$$

Since this calculation requires a square root and significant computation time, a more practical application would be to use the magnitude squared directly, eliminating the square root calculation.

A second magnitude relationship stems from the physics of the system. In equation (3) above, the current vector lags the voltage vector by 90°. With the carrier signal voltage command aligned with the real axis in the positive sequence reference frame, the majority of the carrier signal current is aligned with the imaginary axis in the positive sequence reference frame. Thus, the d-axis component is a good approximation of the carrier sequence current magnitude, and is easily accessed through processing of the signal using the transformations shown in FIG. 5. The approximation of the carrier signal current magnitude for the implementation that follows is given by the following equation:

$$|i_{qds}^{pc}| \cong i_{ds}^{pc} \qquad (5)$$

Figure 6:
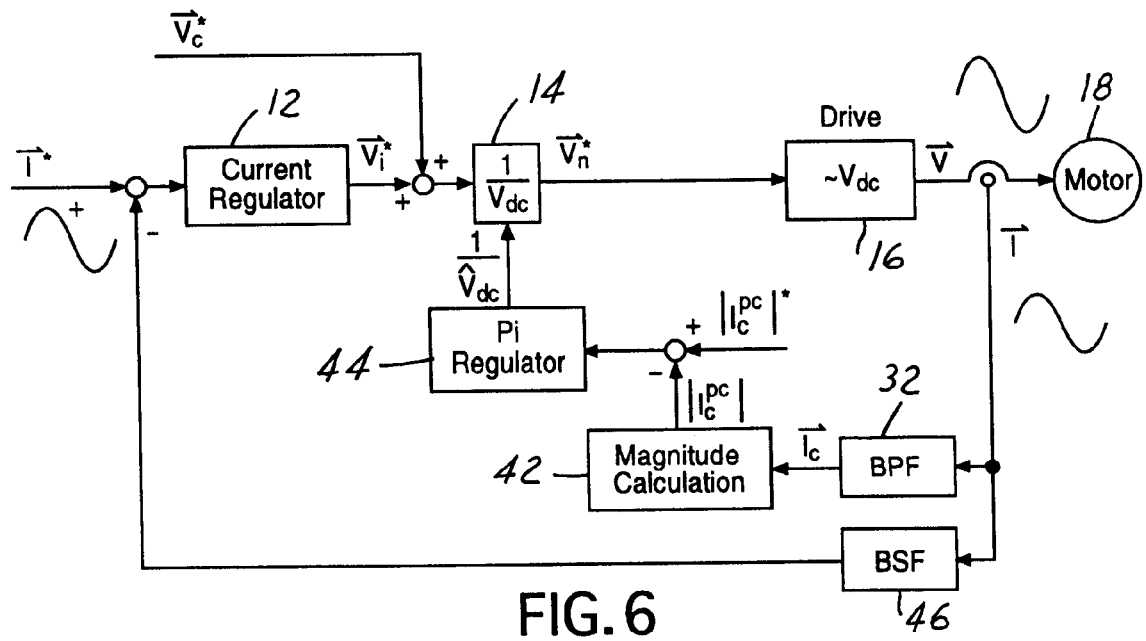
FIG. 6 is a block diagram of an electric machine drive system using carrier signal injection to estimate DC bus voltage in accordance with the preferred embodiment of the present invention.

In accordance with the present invention, such a DC bus voltage estimator is shown in FIG. 6. The command to the DC bus voltage estimator is the anticipated positive sequence carrier signal current magnitude. The measured magnitude is referenced to this and the difference is fed through a proportional plus integral block. More specifically the current is passed through the bandpass filter 32 and its absolute magnitude is calculated at 42. The measured magnitude of current is subtracted from the anticipated current value and is delivered to the PI regulator which outputs a signal that is the inverse of the DC bus voltage estimate. In this embodiment, the carrier signal voltage command must be injected before the commanded voltage is normalized by the DC bus voltage. This provides the necessary negative feedback path to achieve stability of the controller and convergence of the estimate.

Figure 7:
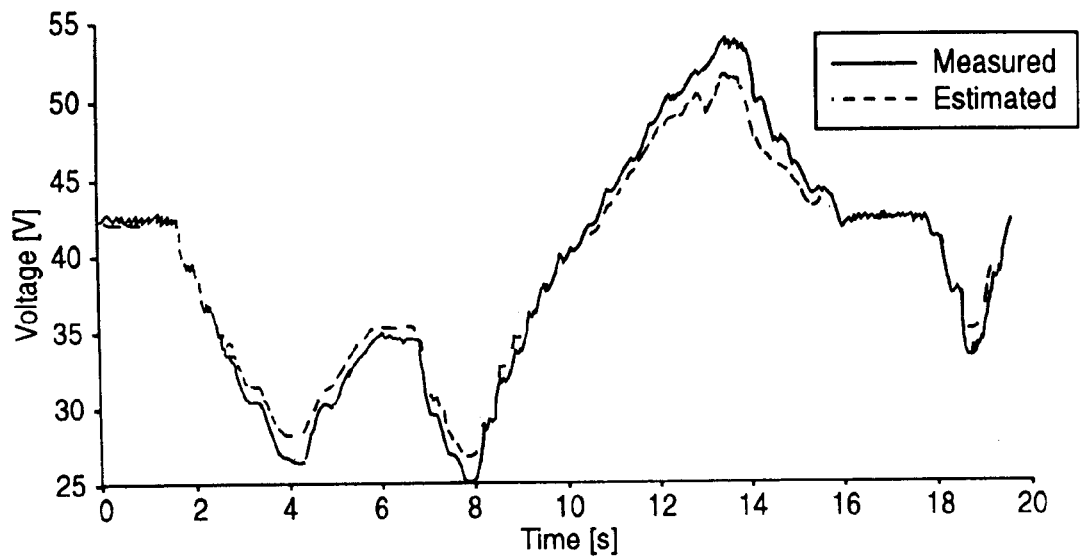
FIG. 7 is a plot showing the estimated DC bus voltage and measured DC bus voltage versus time using the machine drive system shown in FIG. 6.

Experimental results for the bus voltage estimation using the PI controller method according to the system shown in FIG. 6 is depicted in FIG. 7. Specifically, FIG. 7 shows the estimated DC bus voltage and measured DC bus voltage versus time using the PI controller method in FIG. 6. General tracking of the DC bus voltage is apparent but it can be seen that there are slight inconsistencies around 50 V. This agrees with the original experimental plot that correlates the positive sequence carrier signal current magnitude to the bus voltage shown in FIG. 4.

Figure 8:
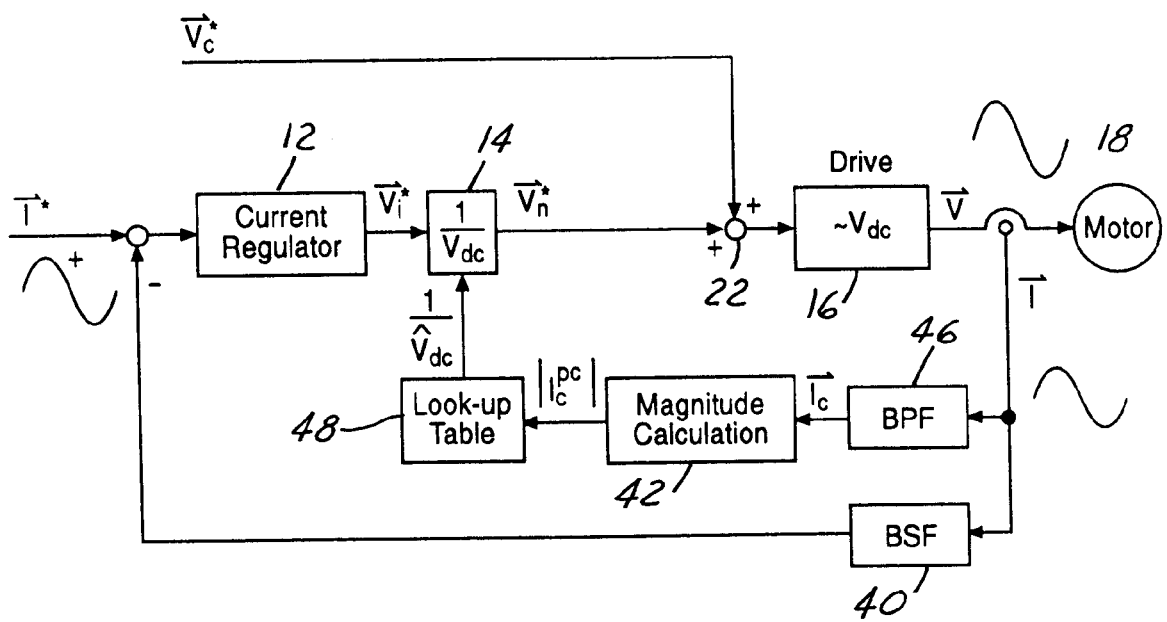
FIG. 8 is a block diagram of an electric machine drive system using carrier signal injection to estimate DC bus voltage in accordance with an alternate embodiment of the present invention; and, FIG. 9 is a plot of the estimated DC bus voltage and measured DC bus voltage versus time, using the machine drive system shown in FIG. 8.

FIG. 8 depicts an alternative system and method for estimating the DC bus voltage that employs a look-up table 48. The current signal is processed by a bandpass filter 46, and the magnitude of the signal is calculated at 42. The measured positive sequence carrier signal current magnitude is delivered to the look-up table 48, comprising a memory wherein there is stored a plurality of experimentally derived sets of data that defined predetermined relationships between the measured positive sequence carrier signal current magnitude and the inverse of the estimated bus voltage magnitude. In contrast to the arrangement shown in FIG. 6 the embodiment of FIG. 8 requires that. the carrier voltage signal command be injected after the commanded voltage is normalized by the DC bus voltage estimate.

Figure 9:
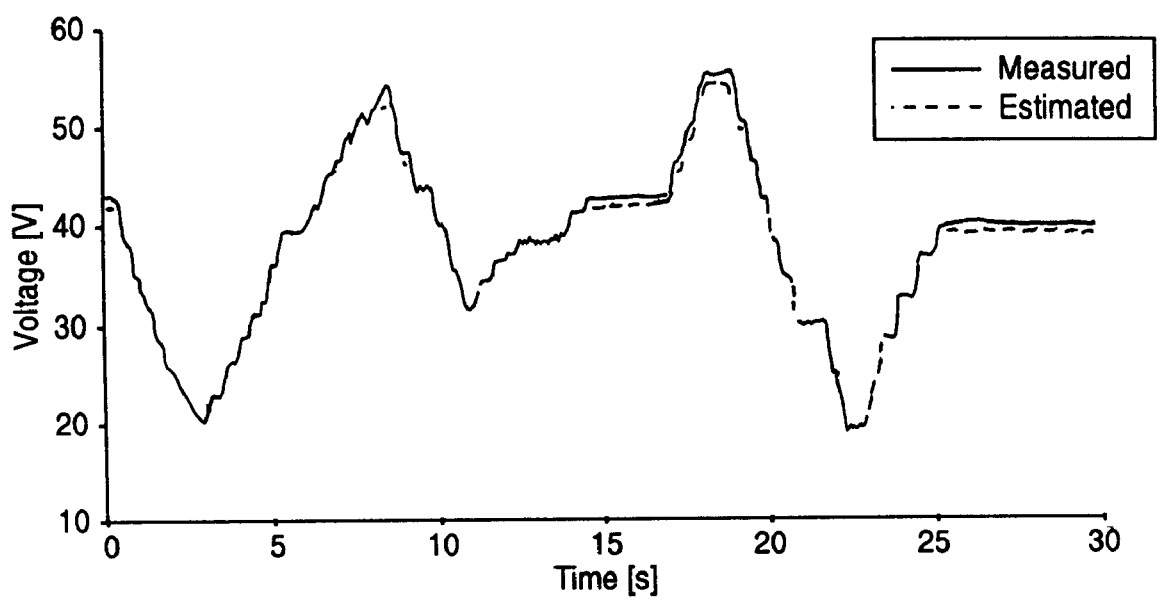

FIG. 9 shows experimental results of the look-up table method of DC bus voltage estimation shown in FIG. 8. Specifically FIG. 9 depicts the estimated DC bus voltage and measured DC bus voltage versus time. From this plot, it may be appreciated that there is good agreement between the measured and estimated DC bus voltage in accordance with the method and system shown in FIG. 8. From the foregoing, it is apparent that the DC bus voltage estimation method described above not only provides for the reliable accomplishment of the objects of the invention, but does so in a particularly effective and economical manner. It is recognized, of course, that those skilled in the art may make various modifications or additions chosen to illustrate the invention without departing from the spirit and scope of the present contribution to the art. Accordingly, it is to be understood that the protection sought and to be afforded hereby should be deemed to extend to the subject matter claimed and all equivalents thereof fairly within the scope of the invention.

What is claimed is:

1. A method of driving an electric machine system, comprising the steps of:

(A) generating a commanded voltage signal;

(B) injecting a carrier signal voltage at a frequency that is non-synchronous with the fundamental excitation into said system, said carrier signal voltage inducing a carrier signal current in said system having positive sequence current component;

(C) determining the magnitude of said positive sequence current component;

(D) estimating a DC bus voltage of said system using the magnitude determined in step (C); and, (E) normalizing said commanded voltage signal based on the DC bus voltage estimated in step (D).

2. The method of claim 1, including the step of determining the value difference between the magnitude determined in step (C) and an anticipated magnitude of said positive sequence current component, and wherein the DC bus voltage estimated in step (D) is based on said value difference.

3. The method of claim 2, wherein step (D) is performed by operating on said value difference using proportional and integral gains.

4. The method of claim 1, including the step of generating the inverse value of the DC bus voltage estimated in step (D), and wherein step (E) is performed by modifying said commanded voltage signal using said inverse value.

5. The method of claim 1, including the step of filtering said positive sequence current component of said carrier signal voltage from a fundamental excitation signal used to drive said system.

6. The method of claim 1 including the step of extracting said positive sequence current component of said carrier signal voltage from the excitation signal used to drive said system.

7. The method of claim 6, wherein said extracting includes rotating vectors representative of components of said excitation signal, and filtering certain of said components.

8. The method of claim 1, including the steps of:

sensing the excitation signal used to drive said system;

filtering said carrier signal voltage from said sensed excitation signal to produce a feedback control signal; and modifying the command voltage signal based on the value of said feedback control signal.

9. The method of claim 1, wherein step (B) is performed after step (E).

10. The method of claim 1, wherein step (C) is performed by determining the absolute value of said positive sequence current component.

11. The method of claim 1, wherein step (D) is performed by:

storing a plurality of values of positive sequence current component values, and a plurality of respectively associated estimates of DC bus voltages, and looking up a stored value of positive sequence current component to determine the corresponding estimate of DC bus voltage.

12. The method of claim 1, wherein step (D) is performed using a look-up table relating a plurality of positive sequence current values to corresponding estimates of DC bus voltages.

* * * * *